UNITED STATES PATENT OFFICE.

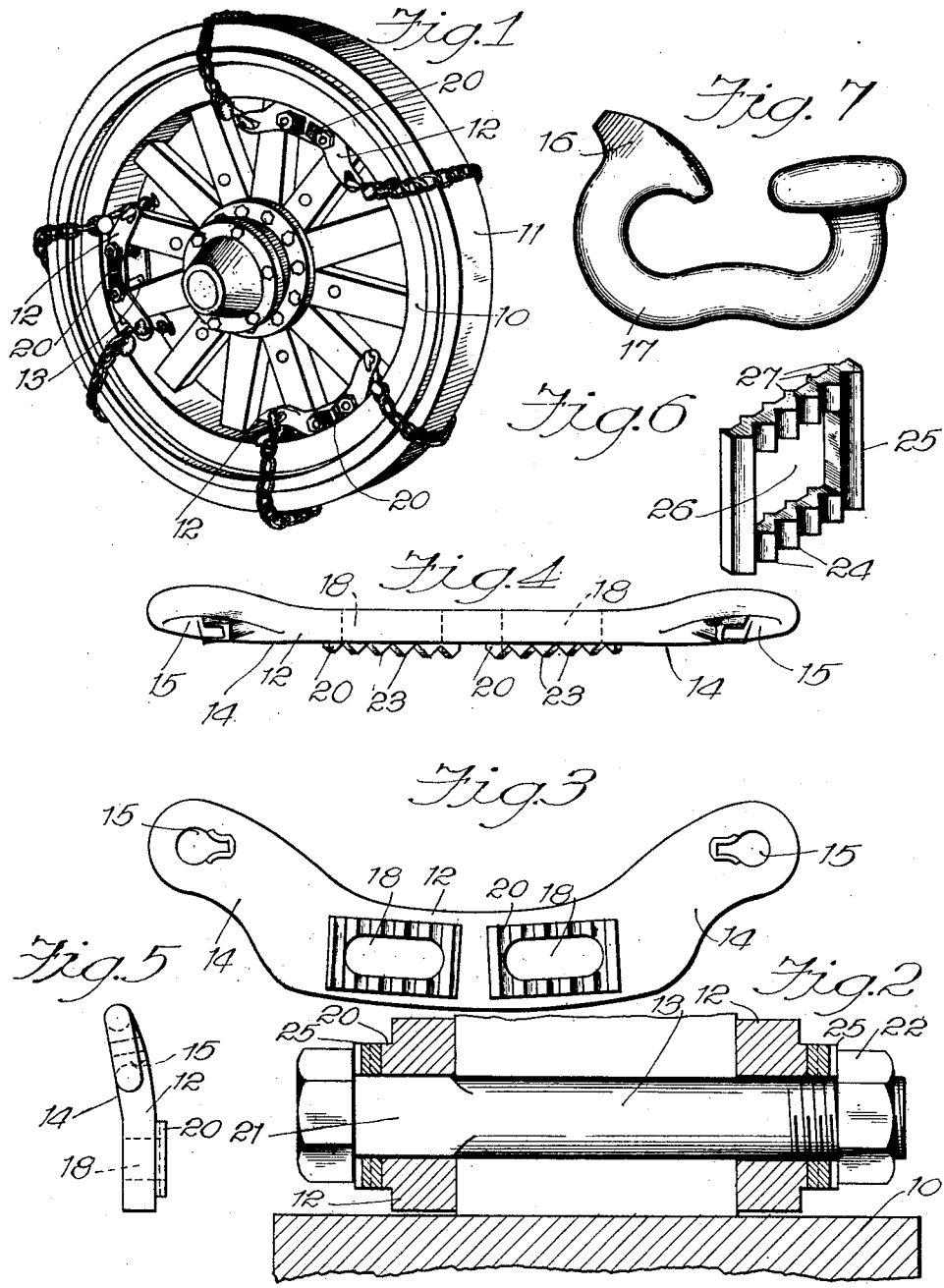

WILLIAM H. KRUG, OF OSHKOSH, WISCONSIN.

ANTISKID DEVICE FOR VEHICLES.

1,383,407.     Specification of Letters Patent.     Patented July 5, 1921.

Application filed January 31, 1919. Serial No. 274,161.

*To all whom it may concern:*

Be it known that I, WILLIAM H. KRUG, a citizen of the United States, residing at Oshkosh, in the county of Winnebago and State of Wisconsin, have invented a certain new and useful Improvement in Antiskid Devices for Vehicles, of which the following is a full, clear, concise, and exact description, reference being had to the accompanying drawings, forming a part of this specification.

My invention relates to improvements in anti-skid devices for vehicles and is especially concerned with any devices of this kind adapted to be used upon motor trucks or other vehicles designed to carry heavy loads.

The objects of my invention are:

First: To provide means for securing the ends of anti-skid chains to vehicles, comprising a pair of clamping members which are adapted to be secured to two adjacent spokes of the wheels to which they are applied, the means for securing the clamping members to the spokes being of such construction that they can be readily adjusted to secure the clamping members to wheels in which the spokes are spaced various distances apart.

Second: To provide means of the type described, comprising common means for locking the bolts which are used to secure the clamping members to the spokes so that the nuts thereof will not become loosened and for reinforcing the clamping members against lateral strain, and Third: To provide means, as described above, which include means for preventing the bolts from shifting toward each other and thereby permitting the clamping members to move upon the wheel.

Other objects will appear as this description progresses, reference being had to the accompanying drawing, in which:

Figure 1 is a perspective view of a vehicle wheel showing my invention applied thereto.

Fig. 2 is a fragmentary sectional view taken transversely of the felly of the wheel, showing certain features of my invention.

Fig. 3 is a side elevation of my improved clamping bar or member.

Fig. 4 is an edge view thereof.

Fig. 5 is an end view of the structure shown in Figs. 3 and 4.

Fig. 6 is a perspective view of a locking plate which I use in connection with the members shown in Figs. 3, 4 and 5, and Fig. 7 is a side elevation of a coupling member which I use for securing the ends of the anti-skid chains to the clamping bars.

In the several figures similar reference characters are used to refer to similar parts.

The application of George S. Everhart, Serial No. 202,631, filed November 17, 1917, discloses means for securing anti-skid chains to wheels, comprising a pair of clamping bars adapted to be secured to opposite sides of an adjacent pair of spokes by means of a pair of bolts, the bolts being so spaced as to contact with the opposed faces of the pair of spokes. The ends of these clamping bars are offset inwardly and inclined at an angle to the planes of the central portion of the clamping bars, and are provided with keyhole slots for receiving the ends of coupling members which secure two anti-skid chains to the clamping bars.

The spacing apart of the spokes in wheels of vehicles designed to support varying loads and manufactured by different manufacturers varies considerably, and it has consequently heretofore been necessary to make clamping bars for each and every wheel, where the spacing of the spokes of these wheels varied. It is necessary that there be practically no play between the bolts and the spokes. Otherwise, the clamping bars or members will shift back and forth between the two adjacent spokes and cause the bolts to gradually abrade the spokes at the point where they come into contact with them. With the construction disclosed in the Everhart application above referred to, it has been necessary to manufacture each clamping bar to fit the wheel for which it is designed. This involves a large financial outlay in tools for producing clamps for various sizes and makes of vehicles, and also increases the cost of manufacture. As stated above, it is the object of my invention to provide a clamping means which includes means for securing it to a large variety of wheels in which the spokes are spaced apart different distances. By this means I am enabled to materially reduce the number of styles or sizes of clamps which it is necessary to manufacture and carry in stock, and to correspondingly reduce the cost of manufacture. I accomplish this result by means of the devices illustrated in the accompanying drawing.

Referring to Fig. 1, reference character 10 indicates the felly of the vehicle wheel provided with a suitable tire 11, which may be of any preferred type. The reference characters 12 indicate clamping bars or members which are secured to adjacent spokes by means of bolts 13. The ends of the clamping members are offset inwardly, as shown at 14, and the offset portions are twisted from the planes of the central portions of the clamping bars, as clearly shown in Figs. 4 and 5. These offset portions are provided with key-hole slots 15 for receiving the end 16 of the coupling member 17, shown on an enlarged scale in Fig. 7. This coupling member is described and claimed in detail in my patent, Serial No. 1,302,470, April 29, 1919, and need not therefore be further described herein. It is only necessary to state that the anti-skid chains are provided at each end with coupling members of the type disclosed in this figure, and the coupling members are secured to the clamps 12 by maniuplating the coupling members until their heads pass through the key-hole slots 15.

Each of the bars 12 are provided with a pair of spaced, longitudinally-extending slots 18 for receiving the shanks of the bolts 13. The resistance of the clamping bars 12 against transverse stresses imposed thereon by the bolts 13 is considerably reduced by the formation of the slots 18 therein, and in order to compensate for this reduction in the lateral resistance of the clamping bars, I provide each of them with reinforcing ribs 20, extending along each side of the slots. The bolts 13 extend through the slots 18, and are provided adjacent their heads with portions 21 of square cross section of such size as to co-act with the sides of the slots to prevent the bolts 13 from turning thereon when the nuts 22 are applied.

The ribs 20 are provided with a plurality of transverse corrugations or ridges 23, which are illustrated as having a saw-tooth cross section. These teeth co-act with the teeth 24 of the locking plates 25 to prevent these locking plates from moving longitudinally of the clamping bars. The locking plates are provided with openings 26 through which the bolts 19 are inserted. Small saw-tooth shaped corrugations or ribs 27 are formed on the side of the locking plate opposite the teeth 24, and serve as means to lock the nut 22 of the bolt 19 against rotation when it is once tightened to clamp the bars 12 to the spokes.

From the above description it will be clear that the locking plates have two functions,—first, to prevent the shifting of the bolts 19 longitudinally of the bars 12; and second, to prevent the unloosening of the nuts 22.

From an inspection of Fig. 4 it will be noted that the outer edges of the ribs 20 are inclined away from the clamping bars 12 from their outer ends toward the centers of the clamping bars. My purpose in providing this construction is to more thoroughly prevent any movement of the bars 19 toward each other in the event that the nuts 22 should become slightly loosened. It will be clear that by thus inclining the outer edges of the ribs 20 away from the center portions of the clamping bars it will be necessary for the nuts 22 to be unthreaded from the bolts 19 progressively increasing distances, in order to permit these bolts to move toward each other.

While I have described the details of the preferred embodiment of my invention, it is to be understood that it is capable of other adaptations and modifications coming within the scope of the appended claims.

Having thus described my invention, what I claim is:—

1. Means for clamping one end of an anti-skid chain to a wheel, comprising an elongated clamping bar having an end provided with means for receiving one end of an anti-skid chain, the said bar having a pair of slots formed longitudinally thereof, ribs formed integrally with said bar and having their outer edges in a plane and inclined away from said bar, from the ends thereof toward the center thereof, a plurality of corrugations extending transversely of said ribs, locking plates having corrugations on each side, the corrugations on one side of said locking plates being adapted to interlock with the corrugations of said ribs, the said locking plates being provided with openings for registering with the slots in said bar, and bolts extending through each of said locking plates and the slot registering therewith, the said bolts being provided with portions co-acting with the sides of said slots to prevent the bolts from turning.

2. Means for clamping one end of an anti-skid chain to a wheel, comprising an elongated clamping bar having an end provided with means for receiving one end of an anti-skid chain, and the said bar having a pair of slots formed longitudinally thereof, ribs formed integrally with and having their outer edges in a plane inclined away from said bar, from the ends thereof toward the center thereof, a plurality of corrugations extending transversely of said ribs, locking plates having corrugations on each side, the corrugations on one side of said locking plates being adapted to interlock with the corrugations of said ribs, the said locking plates being provided with openings for registering with the slots in said bar, and bolts extending through each of said locking plates and the slot registering therewith.

3. Means for clamping one end of an anti-skid chain to a wheel, comprising an elongated clamping bar provided with means for receiving one end of an anti-skid chain, the said bar having a pair of slots formed longitudinally thereof, ribs formed integrally with and having their outer edges in a plane inclined away from said bar, from the ends thereof toward the center thereof, and a plurality of corrugations extending transversely of said ribs.

4. Means for securing one end of an anti-skid chain to a wheel, comprising a clamping bar, having a slot extending longitudinally thereof for receiving a clamping bolt, a bolt extending through said slot, a nut for said bolt, and a single means co-acting with said bar and said nut for positively locking said nut to said bolt, and for positively preventing said bolt from shifting in said slot.

5. Means for securing an anti-skid chain to a vehicle wheel comprising a bar having a slot formed therethrough, a plurality of teeth formed longitudinally of said bar and increasing in height toward the center thereof, a bolt extending through said slot and a slotted corrrugated member for co-acting with said teeth to locate said bolt in adjusted position.

In witness whereof, I hereunto subscribe my name this 27th day of January, 1919.

WILLIAM H. KRUG.

Witnesses:
 EDNA V. GUSTAFSON,
 FAE PETRIE.